US008824632B2

(12) United States Patent
Mastronardi (10) Patent No.: US 8,824,632 B2
(45) Date of Patent: Sep. 2, 2014

(54) BACKSCATTER X-RAY INSPECTION VAN WITH TOP-DOWN IMAGING

(75) Inventor: Richard Mastronardi, Medfield, MA (US)

(73) Assignee: American Science and Engineering, Inc., Billerica, MA (US)

( * ) Notice: Subject to any disclaimer, the term of this patent is extended or adjusted under 35 U.S.C. 154(b) by 422 days.

(21) Appl. No.: 13/212,508

(22) Filed: Aug. 18, 2011

(65) Prior Publication Data

US 2012/0033791 A1 Feb. 9, 2012

Related U.S. Application Data

(63) Continuation-in-part of application No. 12/843,341, filed on Jul. 26, 2010, now Pat. No. 8,345,819.

(60) Provisional application No. 61/229,452, filed on Jul. 29, 2009.

(51) Int. Cl.
*G01N 23/203* (2006.01)
*G01N 23/083* (2006.01)
*G01N 23/087* (2006.01)
*G01V 5/00* (2006.01)

(52) U.S. Cl.
CPC ............ *G01V 5/0058* (2013.01); *G01V 5/0033* (2013.01)
USPC ..................... 378/90; 378/57; 378/87; 378/88

(58) Field of Classification Search
USPC .................................... 378/57, 86, 87, 88, 90
See application file for complete search history.

(56) References Cited

U.S. PATENT DOCUMENTS

| | | | |
|---|---|---|---|
| 3,569,708 A | 3/1971 | Weinbaum et al. | 250/83.3 |
| 3,868,506 A | 2/1975 | Ogiso | 250/278 |
| RE28,544 E | 9/1975 | Stein et al. | 250/369 |
| 3,928,765 A | 12/1975 | Teller | 250/272 |
| 3,961,186 A | 6/1976 | Leunbach | 250/272 |
| 4,031,401 A | 6/1977 | Jacob | 250/503 |

(Continued)

FOREIGN PATENT DOCUMENTS

| | | | |
|---|---|---|---|
| EP | 0 261 984 | 3/1988 | G01N 23/04 |
| EP | 0 864 884 | 6/2006 | G01V 5/12 |

(Continued)

OTHER PUBLICATIONS

Schafer et al., "AS&E Cargo Vehicle X-Ray Inspection System", *Proceedings Europto Series*, SPIE—The International Society for Optical Engineering, vol. 2093, pp. 272-282 (Oct. 1993).

(Continued)

*Primary Examiner* — Allen C. Ho
(74) *Attorney, Agent, or Firm* — Sunstein Kann Murphy & Timbers LLP (57) ABSTRACT

A system and method for inspecting a vehicle or other object by means of two sources and one or more detectors of penetrating radiation. The sources and detector(s) are carried on a mobile conveyance and deployed at a point of operation. One source irradiates an inspected object from within an enclosure, while a second source swings away from the conveyance on a deployable member, such as a boom, such that the second source can irradiate the vehicle from above. A backscatter image of the inspected object is based at least in part on radiation from the second source scattered by the inspected object.

9 Claims, 3 Drawing Sheets

(56) References Cited

U.S. PATENT DOCUMENTS

| | | | |
|---|---|---|---|
| 4,047,029 A | 9/1977 | Allport | 250/273 |
| 4,052,617 A | 10/1977 | Garrett et al. | 250/360 |
| 4,064,440 A | 12/1977 | Roder | 250/359 |
| 4,260,898 A | 4/1981 | Annis | 250/505 |
| 4,342,914 A | 8/1982 | Bjorkholm | 378/99 |
| 4,380,817 A | 4/1983 | Harding et al. | 378/87 |
| 4,458,152 A | 7/1984 | Bonora | 250/353 |
| 4,472,822 A | 9/1984 | Swift | 378/10 |
| 4,525,854 A | 6/1985 | Molbert et al. | 378/89 |
| 4,768,214 A | 8/1988 | Bjorkholm | 378/87 |
| 4,799,247 A | 1/1989 | Annis et al. | 378/87 |
| 4,809,312 A | 2/1989 | Annis | 378/146 |
| 4,825,454 A | 4/1989 | Annis et al. | 378/87 |
| 4,839,913 A | 6/1989 | Annis et al. | 378/44 |
| 4,864,142 A | 9/1989 | Gomberg | 250/390.04 |
| 4,870,670 A | 9/1989 | Geus | 378/87 |
| 4,884,289 A | 11/1989 | Glockmann et al. | 378/57 |
| 4,899,283 A | 2/1990 | Annis | 364/413.15 |
| 4,974,247 A | 11/1990 | Friddell | 378/90 |
| 5,002,397 A | 3/1991 | Ingrum et al. | 356/407 |
| 5,014,293 A | 5/1991 | Boyd et al. | 378/197 |
| 5,022,062 A | 6/1991 | Annis | 378/86 |
| 5,065,418 A | 11/1991 | Bermbach et al. | 378/57 |
| 5,068,883 A | 11/1991 | DeHaan et al. | 378/86 |
| 5,091,924 A | 2/1992 | Bermbach et al. | 378/57 |
| 5,132,995 A | 7/1992 | Stein | 378/56 |
| 5,164,976 A | 11/1992 | Scheid et al. | 378/57 |
| 5,179,581 A | 1/1993 | Annis | 378/57 |
| 5,181,234 A | 1/1993 | Smith | 378/87 |
| 5,224,144 A | 6/1993 | Annis | 378/146 |
| 5,247,561 A | 9/1993 | Kotowski | 378/87 |
| 5,253,283 A | 10/1993 | Annis et al. | 378/100 |
| 5,302,817 A | 4/1994 | Yokota et al. | 250/214 VT |
| 5,313,511 A | 5/1994 | Annis et al. | 378/87 |
| 5,349,191 A | 9/1994 | Rogers | 250/367 |
| 5,391,879 A | 2/1995 | Tran et al. | 250/367 |
| 5,394,454 A | 2/1995 | Harding | 378/86 |
| 5,430,787 A | 7/1995 | Norton | 378/87 |
| 5,479,023 A | 12/1995 | Bartle | 250/390.04 |
| 5,591,462 A | 1/1997 | Darling et al. | 425/173 |
| 5,629,966 A | 5/1997 | Dykster et al. | 378/57 |
| 5,638,420 A | 6/1997 | Armistead | 378/57 |
| 5,692,028 A | 11/1997 | Geus et al. | 378/57 |
| 5,692,029 A | 11/1997 | Husseiny et al. | 378/88 |
| 5,696,806 A | 12/1997 | Grodzins et al. | 378/86 |
| 5,763,886 A | 6/1998 | Schulte | 250/358.1 |
| 5,764,683 A | 6/1998 | Swift et al. | 378/57 |
| 5,838,759 A | 11/1998 | Armistead | 378/57 |
| 5,903,623 A | 5/1999 | Swift et al. | 378/57 |
| 5,910,973 A | 6/1999 | Grodzins | 378/57 |
| 5,930,326 A | 7/1999 | Rothschild et al. | 378/57 |
| 5,940,468 A | 8/1999 | Huang et al. | 378/57 |
| 5,974,111 A | 10/1999 | Krug et al. | 378/57 |
| 6,018,562 A | 1/2000 | Willson | 378/9 |
| 6,067,344 A | 5/2000 | Grodzins et al. | 378/117 |
| 6,081,580 A | 6/2000 | Grodzins et al. | 378/87 |
| 6,094,472 A | 7/2000 | Smith | 378/86 |
| 6,124,647 A | 9/2000 | Marcus et al. | 307/10.1 |
| 6,151,381 A | 11/2000 | Grodzins et al. | 378/90 |
| 6,192,104 B1 | 2/2001 | Adams et al. | 378/90 |
| 6,203,846 B1 | 3/2001 | Ellingson et al. | 427/137 |
| 6,212,251 B1 | 4/2001 | Tomura et al. | 378/15 |
| 6,236,709 B1 | 5/2001 | Perry et al. | 378/57 |
| 6,249,567 B1 | 6/2001 | Rothschild et al. | 378/58 |
| 6,252,929 B1 | 6/2001 | Swift et al. | 378/57 |
| 6,269,142 B1 | 7/2001 | Smith | 378/57 |
| 6,278,115 B1 | 8/2001 | Annis et al. | 250/363.01 |
| 6,282,260 B1 | 8/2001 | Grodzins | 378/57 |
| 6,292,533 B1 | 9/2001 | Swift et al. | 378/57 |
| 6,356,620 B1 | 3/2002 | Rothschild et al. | 378/146 |
| 6,421,420 B1 | 7/2002 | Grodzins | 378/98.6 |
| 6,424,695 B1 | 7/2002 | Grodzins et al. | 378/87 |
| 6,434,219 B1 | 8/2002 | Rothschild et al. | 378/160 |
| 6,442,233 B1 | 8/2002 | Grodzins et al. | 378/57 |
| 6,459,761 B1 | 10/2002 | Grodzins et al. | 378/57 |
| 6,459,764 B1 | 10/2002 | Chalmers et al. | 378/88 |
| 6,473,487 B1 | 10/2002 | Le | 378/57 |
| 6,542,580 B1 | 4/2003 | Carver et al. | 378/580 |
| 6,556,653 B2 | 4/2003 | Hussein | 378/90 |
| 6,567,496 B1 | 5/2003 | Sychev | 378/57 |
| 6,658,087 B2 | 12/2003 | Chalmers et al. | 378/86 |
| 6,727,506 B2 | 4/2004 | Mallette | 250/394 |
| 6,763,635 B1 * | 7/2004 | Lowman | 52/114 |
| 6,785,357 B2 * | 8/2004 | Bernardi et al. | 378/57 |
| 6,876,719 B2 | 4/2005 | Ozaki | 378/7 |
| 6,879,657 B2 | 4/2005 | Hoffman | 378/7 |
| 6,920,197 B2 * | 7/2005 | Kang et al. | 378/57 |
| 6,928,141 B2 * | 8/2005 | Carver et al. | 378/57 |
| 7,010,094 B2 | 3/2006 | Grodzins et al. | 378/157 |
| 7,099,434 B2 | 8/2006 | Adams et al. | 378/57 |
| RE39,396 E | 11/2006 | Swift et al. | 378/57 |
| 7,215,737 B2 * | 5/2007 | Li et al. | 378/57 |
| 7,218,704 B1 | 5/2007 | Adams et al. | 378/57 |
| 7,369,643 B2 * | 5/2008 | Kotowski et al. | 378/57 |
| 7,379,530 B2 * | 5/2008 | Hoff et al. | 378/57 |
| 7,400,701 B1 | 7/2008 | Cason | 378/57 |
| 7,497,618 B2 * | 3/2009 | Chen et al. | 378/198 |
| 7,505,556 B2 | 3/2009 | Chalmers et al. | 378/57 |
| 7,551,715 B2 * | 6/2009 | Rothschild et al. | 378/57 |
| 7,593,506 B2 | 9/2009 | Cason | 378/90 |
| 7,623,626 B2 | 11/2009 | Safai et al. | 378/87 |
| 7,660,386 B2 * | 2/2010 | Meng et al. | 378/57 |
| 7,742,568 B2 * | 6/2010 | Smith | 378/98.11 |
| 8,325,871 B2 * | 12/2012 | Grodzins et al. | 376/153 |
| 8,345,819 B2 * | 1/2013 | Mastronardi et al. | 378/57 |
| 8,731,137 B2 * | 5/2014 | Arroyo et al. | 378/57 |
| 2002/0097836 A1 | 7/2002 | Grodzins | 378/57 |
| 2002/0185612 A1 | 12/2002 | Chalmers et al. | 250/492.1 |
| 2003/0016790 A1 | 1/2003 | Grodzins et al. | 378/147 |
| 2003/0091145 A1 | 5/2003 | Mohr et al. | 378/58 |
| 2004/0057554 A1 | 3/2004 | Bjorkholm | 378/143 |
| 2004/0086078 A1 | 5/2004 | Adams et al. | 378/57 |
| 2004/0251415 A1 | 12/2004 | Verbinski et al. | 250/358.1 |
| 2004/0256565 A1 | 12/2004 | Adams et al. | 250/358.1 |
| 2005/0190878 A1 | 9/2005 | De Man et al. | 378/9 |
| 2006/0078091 A1 | 4/2006 | Lasiuk et al. | 378/198 |
| 2007/0009088 A1 | 1/2007 | Edic et al. | 378/62 |
| 2009/0086907 A1 | 4/2009 | Smith | 378/57 |

FOREIGN PATENT DOCUMENTS

| | | | |
|---|---|---|---|
| GB | 2 277 013 | 10/1994 | G01N 23/04 |
| GB | 2 287 163 | 9/1995 | G01N 23/04 |
| GB | 2 400 480 | 10/2004 | G08G 1/00 |
| JP | 63-079042 | 4/1988 | G01N 23/04 |
| WO | WO 98/02763 | 1/1998 | G01V 5/00 |
| WO | WO 98/03889 | 1/1998 | G01V 5/00 |
| WO | WO 98/20366 | 5/1998 | G01T 1/29 |
| WO | WO 99/39189 | 8/1999 | G01N 23/04 |
| WO | WO 00/33060 | 6/2000 | G01N 23/20 |
| WO | WO 00/37928 | 6/2000 | G01N 23/04 |
| WO | WO 2004/010127 | 1/2004 | G01N 23/04 |
| WO | WO 2004/043740 | 5/2004 | |

OTHER PUBLICATIONS

Lawrence, "Cargo Inspection Technologies", *SPIE—The International Society for Optical Engineering*, vol. 2276, pp. 242-254 (Jul. 1994).

Chou, "Fourier coded-aperture imaging in nuclear medicine", *IEEE Proc. Sci. Meas. Technol.*, vol. 141., No. 3, pp .179-184 (May 1994).

Mertz et al., "Rotational aperture synthesis for x rays", *J. Opt. Soc. of Am. A*, vol. 3, No. 12, pp. 2167-2170, (1986).

European Patent Office, *International Search Report*—International Application No. PCT/US2010/043201, dated Oct. 29, 2010 (7 pages).

European Patent Office, Written Opinion of the International Searching Authority—International Application No. PCT/US2010/043201, dated Oct. 29, 2010 (6 pages).

European Patent Office, *Summons to attend oral proceedings pursuant to Rule 115(1) EPC*, Application No. 05743513.3-2204 / 1733213, dated May 6, 2009 (3 pages).

(56) References Cited

OTHER PUBLICATIONS

European Patent Office, *International Search Report*—International Application No. PCT/US1998/018642, dated Jul. 7, 1999 (6 pages).
International Preliminary Examining Authority-US, *International Preliminary Examination Report*—International Application No. PCT/US1998/018642, dated Aug. 30, 1999 (4 pages).
European Patent Office, *International Search Report*—International Application No. PCT/US1999/028266, dated Sep. 6, 2000 (3 pages).
European Patent Office, *International Search Report*—International Application No. PCT/US1999/028035, dated Sep. 15, 2000 (6 pages).
International Preliminary Examining Authority-US, *Written Opinion of the International Searching Authority*—International Application No. PCT/US1999/028035, dated Apr. 20, 2001 (4 pages).
International Preliminary Examining Authority-US, *International Preliminary Examination Report*—International Application No. PCT/US1999/028035, dated Mar. 25, 2002 (3 pages).
European Patent Office, *International Search Report and Written Opinion of the International Searching Authority*—International Application No. PCT/US2005/011382, dated Oct. 21, 2005 (11 pages).
International Bureau of WIPO, *International Preliminary Report on Patentability*—International Application No. PCT/US2005/011382, dated Oct. 19, 2006 (7 pages).
European Patent Office, *International Search Report*—International Application No. PCT/US2007/066936, dated Sep. 30, 2008 (5 pages).
European Patent Office, *Written Opinion of the International Searching Authority*—International Application No. PCT/US2007/066936, dated Sep. 30, 2008 (7 pages).
Justice Zobel, U.S. District Court Judge for the United States District Court of Massachusetts, Memorandum of Decision, dated Jun. 20, 2006 in *L-3 Communications Security and Detection Systems Corporation Delaware v. American Science & Engineering, Inc.*, U.S. District Court of Massachusetts, Civil Action No. 04-10339-RWZ (2 pages).
Erik S. Belt, Esq. Bromberg & Sunstein LLP, AS&E's Motion for Reconsideration of Partial Summary Judgment and, in the Alternative, Entry of Final Judgment and a Stay Pending Appeal, dated Oct. 7, 2005, in *L-3 Communications Security and Detection Systems Corporation Delaware v. American Science & Engineering, Inc.*, U.S. District Court of Massachusetts, Civil Action No. 04-10339-RWZ (2 pages).
Erik S. Belt, Esq. Bromberg & Sunstein LLP, AS&E's Memorandum in Support of Its Motion for Reconsideration of Partial Summary Judgment and, in the Alternative, Entry of Final Judgment and a Stay Pending Appeal, dated Oct. 7, 2005, in *L-3 Communications Security and Detection Systems Corporation Delaware v. American Science & Engineering, Inc.*, U.S. District Court of Massachusetts, Civil Action No. 04-10339-RWZ (14 pages).
Samuel J. Petuchowski, Ph.D., Esq. Bromberg & Sunstein LLP, Declaration of Samuel J. Petuchowski, Ph.D., Esq. dated Oct. 7, 2005, in *L-3 Communications Security and Detection Systems Corporation Delaware v. American Science & Engineering, Inc.*, U.S. District Court of Massachusetts, Civil Action No. 04-10339-RWZ (4 pages).
U.S. Army CECOM, U.S. Army Contract DAAB10-95-C-0001, dated Oct. 19, 1994 (112 pages).
Michael A. Albert, Esq. Wolf, Greefield & Sacks P.C., Amended Complaint for Declaratory Judgment, dated Jun. 17, 2004, in *L-3 Communications Security and Detection Systems Corporation Delaware v. American Science & Engineering, Inc.*, U.S. District Court of Massachusetts, Civil Action No. 04-10339-RWZ (11 pages).
Erik S. Belt, Esq. Bromberg & Sunstein LLP, American Science & Engineering's Answer to L-3's Amended Complaint and Counterclaims for Patent Infringement, dated Jun. 30, 2004, in *L-3 Communications Security and Detection Systems Corporation Delaware v. American Science & Engineering, Inc.*, U.S. District Court of Massachusetts, Civil Action No. 04-10339-RWZ (14 pages).
James J. Foster, Esq. Wolf, Greefield & Sacks P.C., L-3's Memorandum in Support of its Motion for Partial Summary Judgment that Certain Claims of U.S. Patent No. 5,903,623 are Invalid Under 35 U.S.C.§102(b), dated Mar. 3, 2005, in *L-3 Communications Security and Detection Systems Corporation Delaware v. American Science & Engineering, Inc.*, U.S. District Court of Massachusetts, Civil Action No. 04-10339-RWZ (27 pages).
James J. Foster, Esq. Wolf, Greefield & Sacks P.C., L-3's Local Rule 56.1 Statement of Facts in Support of its Motion for Partial Summary Judgment that Certain Claims of U.S. Patent No. 5,903,623 are Invalid Under 35 U.S.C.§102(b), dated Mar. 3, 2005, in *L-3 Communications Security and Detection Systems Corporation Delaware v. American Science & Engineering, Inc.*, U.S. District Court of Massachusetts, Civil Action No. 04-10339-RWZ (2 pages).
Erik S. Belt, Esq. Bromberg & Sunstein LLP, AS&E's Opposition to L-3's Motion for Partial Summary Judgment Concerning the Validity of U.S. Patent No. 5,903,623, dated Mar. 17, 2005, in *L-3 Communications Security and Detection Systems Corporation Delaware v. American Science & Engineering, Inc.*, U.S. District Court of Massachusetts, Civil Action No. 04-10339-RWZ (22 pages).
Erik S. Belt, Esq. Bromberg & Sunstein LLP, AS&E's LR 56.1 Statement of Material Facts Opposing L-3's Motion for Partial Summary Judgment Concerning the Validity of U.S. Patent No. 5,903,623, CA No. 04-10339-RWZ, dated Mar. 17, 2005, in *L-3 Communications Security and Detection Systems Corporation Delaware v. American Science & Engineering, Inc.*, U.S. District Court of Massachusetts, Civil Action No. 04-10339-RWZ (7 pages).
James J. Foster, Esq. Wolf, Greefield & Sacks P.C., L-3's Reply Memorandum in Support of its Motion for Partial Summary Judgment that Certain Claims of U.S. Patent No. 5,903,623 are Invalid Under 35 U.S.C. 21§102(b), CA No. 04-10339-RWZ, dated Apr. 4, 2005, in *L-3 Communications Security and Detection Systems Corporation Delaware v. American Science & Engineering, Inc.*, U.S. District Court of Massachusetts, Civil Action No. 04-10339-RWZ (211 pages).

\* cited by examiner

BACKSCATTER X-RAY INSPECTION VAN WITH TOP-DOWN IMAGING

The present application is a continuation-in-part of U.S. patent application Ser. No. 12/843,341, filed Jul. 26, 2010, issued as U.S. Pat. No. 8,345,819 on Jan. 1, 2013, and, like that application, claims priority from U.S. Provisional Application Ser. No. 61/229,452, entitled "Top-Down X-Ray Inspection Trailer," filed on Jul. 29, 2009. Both of the foregoing applications are incorporated herein by reference.

TECHNICAL FIELD

The present invention relates to systems and methods for inspecting objects with penetrating radiation, and, more particularly, the invention relates to inspection systems that may be deployed on mobile platforms of various sorts.

BACKGROUND ART

The interdiction of illicit drugs, explosives, and other contraband is an important goal of law enforcement. To that end, a variety of technologies have been developed and deployed for the non-intrusive inspection of objects, such as vehicles or containers, that are not readily susceptible to visual scrutiny from the outside. The non-intrusive aspect of these inspection techniques is important; the great majority of containers do not carry contraband, and the public would not long tolerate the delays, disruption (and in some cases damage) of property, and invasions of privacy that would occur if invasive inspection means were commonly used. Non-intrusive inspection is typically non-destructive and can usually be accomplished faster than intrusive inspection, thereby increasing productivity of inspectors. Increased productivity means more containers inspected and more contraband interdicted.

Among non-intrusive inspection methods, x-ray imaging in its many forms is a proven technology capable of detecting a variety of contraband. X-ray systems have been based on transmission imaging in any of a variety of implementations: cone-beam, fanbeam, flying-spot, multi-projection configurations; dual-energy imaging; computed tomography; as well as on imaging incorporating the detection of x-ray radiation scattered in various directions. Imaging using scattered x-rays detected from a mobile platform is the subject, for example, of U.S. Pat. No. 5,764,683, issued Jun. 9, 1998, which is incorporated herein by reference. Imaging using scattered x-rays detected from within a concealing enclosure is the subject, for example, of U.S. Pat. No. 7,099,434, issued Aug. 29, 2006, and U.S. Pat. No. 7,505,556, issued Mar. 17, 2009, both of which patents are incorporated herein by reference.

A weakness of inspection systems based on sideways-directed x-ray beams is that threatening materials located on the floor, in the back seat, or in the trunk of an inspected vehicle may be missed because of the side-shooting geometry and because of the amount of material (and clutter) in the beam path.

It is desirable to determine the presence of objects, such as contraband, weapons, or explosives, that have been concealed, for example, in a moving vehicle, or on a person, or in any inspected object, while the inspected object is moved past one or more systems that image the contents of the object using penetrating radiation. The determination should be capable of being made while the inspected object is in motion, or, alternatively, while the inspection system is in motion with respect to the inspected person or object. Indeed, since inspection rate, and thus hourly throughput, is at a premium, it is desirable that the vehicle, for example, be driven without requiring the driver or passengers to alight. In cases where a detection is made, a visual image should be available for verification.

Various inspection systems that have been deployed employ radiation that is incident on the inspected object and then scattered by the object and its contents in various directions. The use of images produced by detection and analysis of penetrating radiation scattered from an irradiated object, container, or vehicle is the subject, for example, of U.S. Pat. No. 6,459,764, to Chalmers et al. (the "Chalmers Patent"), issued Oct. 1, 2002, and incorporated herein by reference. The Chalmers Patent teaches backscatter inspection of a moving vehicle by illuminating the vehicle with x-rays from above or beneath the moving vehicle, as well as from the side, however, each of the backscatter systems taught therein require ponderous fixed-site installations.

The use of an x-ray source and an x-ray detector, both located in a portal, for purposes of screening personnel, is the subject, for example, of U.S. Pat. No. 6,094,072, to Smith, issued Jul. 25, 2000, and incorporated herein by reference. A portal, however, is not typically amenable to rapid and flexible deployment, but, rather, requires a dedicated installation. An inspection system providing these features is desirable.

SUMMARY OF EMBODIMENTS OF THE INVENTION

In one embodiment of the present invention, there is provided an inspection system for inspecting an object. The system has a conveyance capable of on-road travel and a first source of penetrating radiation disposed on a deployable member coupled to the conveyance for providing a first beam of penetrating radiation directed in a substantially vertical direction. Additionally, the system has a second source of penetrating radiation disposed upon the conveyance for providing a second beam of penetrating radiation directed in a varying direction, where the varying direction passes through a horizontal direction. The system has a first detector for detecting penetrating radiation from at least the first source after interaction of the object with the first beam of penetrating radiation and for generation of a downward-looking scatter signal corresponding to radiation scattered from the first beam. Finally, the system has a controller for creating an image of contents of the object based at least on the downward-looking scatter signal.

In other embodiments of the invention, the inspection system has a second detector as well. The second detector detects penetrating radiation from at least the second source after interaction of the object with the second beam of penetrating radiation and generates a side-looking scatter signal corresponding to radiation scattered from the second beam.

The deployable member may be a boom, and the boom may be capable of extension outward at approximately 90° to the central axis of the conveyance during the course of inspection. The conveyance may be self-propelled, or may include a trailer.

In alternate embodiments of the invention, the first detector may be mechanically coupled to the conveyance, or may be adapted for deployment from the conveyance prior to inspection operation. The deployable member may be adapted for rotation about either a vertical axis or a horizontal axis, from a stowed position to an operational position. Alternatively, The inspection system as set forth in claim 1, wherein the deployable member is adapted for sliding out in a horizontal direction from a stowed position to an operational position.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

As used in this description and in the appended claims, a "vehicle" includes any conveyance that may be driven, pushed, or pulled from one place to another, whether over the surface of land or otherwise. The term "vehicle," as used herein, further includes the structures, components and contents that are conveyed together with the vehicle.

The invention described herein serves to characterize materials which may be contained within a vehicle and thus not readily susceptible to visual scrutiny. The characteristics of a material which might be the object of non-invasive inspection and which lend themselves to detection using the device and method taught by the invention include, but are not limited to, electron density, atomic number, mass density, linear dimensions and shape. These characteristics are unveiled by taking advantage of the various physical processes by which penetrating radiation interacts with matter. Penetrating radiation refers to electromagnetic radiation of sufficient energy per photon to penetrate materials of interest to a substantial and useful degree and include x-rays and more energetic forms of radiation. The interaction of such radiation with matter can generally be categorized as either scattering or absorption processes. Both types of process remove x-ray photons from a collimated (i.e., directional) beam; scattering processes do so by deflecting photons into new directions (usually with loss of energy), while absorption processes simply remove photons from the beam.

X-ray images, or images derived from scatter or transmission of any penetrating radiation, may provide a map of the attenuation and/or scatter characteristics of the inspected object for the full spectrum of the beam penetrating radiation. It should be noted that images may be directly displayed in graphic format for the visual inspection of human operators, but need not be so displayed. As used in this description and in the appended claims, the term "image" refers to any multidimensional representation, whether in tangible or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as atomic number, in one or more colors constitutes an image. So, also, is an array of numbers in a computer memory or holographic medium. Similarly, "imaging" refers to the rendering of a stated physical characteristic in terms of one or more images.

In the range of photon energies useful for penetrating and screening vehicles, the scattering contribution is dominated by incoherent, or Compton scattering, and the absorption contribution is dominated by the photoelectric effect at lower energies, and by pair production at higher energies. The cross sections for Compton scattering and photoelectric absorption vary with both the atomic number of the material and with the energy of the x-ray photon, but in very different ways. The photoelectric absorption decreases very rapidly with increasing photon energy, and increases very rapidly with increasing Z of the material. The Compton scattering cross section changes very slowly with energy and is only weakly dependent on atomic number. The pair production cross section can be ignored for sources with an energy below about 4 MeV, and increases with increasing Z of the material. Such differences in scattering and absorption characteristics between low-Z materials, characteristic of organic materials, and high-Z materials, characteristic of most metals and their alloys, are typical and provide the means to differentiate between these two classes of materials.

Backscatter imaging, in which the x-rays scattered by a material in a generally backward direction are employed, offers several unique inspection capabilities and operational features. (1) Taken alone, it is a one-sided imaging modality: images can be obtained even when the object is accessible from only one side, or, the object is too thick to be penetrated radiographically. (2) Because the scatter signal falls off quite rapidly with increasing depth into the object, backscatter images effectively represent a "slice" of the object characteristic of the side nearest to the x-ray source; this image is frequently useful even when a transmission image representing the same scanned area is hopelessly confused by image clutter. (3) The underlying physical phenomenon that leads to scattered radiation is the Compton effect. Low atomic number (low-Z) materials, which encompass organic materials, interact with x-rays principally by Compton scattering. Narcotic drugs, being among the densest of organic materials, tend to produce the brightest signatures in a backscatter image, as do organic explosives, making backscatter imaging a useful imaging modality for bomb or drug detection. (4) Alignment requirements of the x-ray beam with detectors or collimation devices are less exacting than for transmission imaging thereby enabling rapid deployment in a wide range of inspection scenarios.

One method to image concealed materials, and low-Z materials in particular, is backscatter imaging. The technique relies upon the direct detection of photons which have been Compton scattered. An image is created that is separate and independent of any transmission image that may be produced at the same time. Since the photoelectric absorption cross section is small for organic materials, they interact almost entirely through Compton scattering, producing relatively large scatter signatures. Metals, on the other hand, interact almost exclusively by photoelectric absorption, so that their scatter image signature is comparatively small. The backscatter image directly reveals organic materials such as drugs or explosives.

Flying-spot technology makes possible the acquisition of images using detectors specifically positioned to collect the scattered x-rays. In a typical flying-spot system, a thin "pencil beam" of x-rays is rapidly and repetitively swept through a source-centered, vertically-oriented "fan" of beam paths that are arranged to intercept the object under inspection. At the same time, the object is moved at a constant, slower speed along a path perpendicular to the fan, on a horizontally moving conveyor belt for example, or in the case of vehicles, by being propelled or towed through the beam. In this way, the pencil beam is made to traverse the object in point-by-point raster fashion, and the entire object is scanned as it passes through the fan plane over a period ranging from a few seconds to a few minutes depending upon the length of the object and its speed.

Although the total scan time may be seconds to minutes in duration, the actual exposure time of any part of the scanned object is only the time it takes for the pencil beam to sweep across that part. That exposure time for a given part of the object is typically in the range of 8 to 64 microseconds, depending on the design and the application, and yields an entrance exposure to the scanned object of only tens or hundreds of microroentgens. This low dose to the object also means that there is little radiation available to scatter into the environment, so the doses to operators and other bystanders is correspondingly low. Separate, large-area detectors are deployed adjacent to the beam plane on the x-ray source side of the scanned object, and with their active surfaces oriented toward the scanned object. These detectors need only provide a large solid angle for collection of scattered radiation; no critical alignments are required. In this location these detectors respond to x-rays which are scattered generally back toward the source from the object.

Typically, x-ray transmission by organic materials is greater than by higher density, higher atomic-number materials such as metals. Since the x-ray transmission image is a result of interactions throughout a path through the entire object, larger and more complex objects such as cargo containers produce more confusing transmission images. Under these circumstances, even the presence of small amounts of metal and normal expected organic materials can produce extremely cluttered images masking the sought-for contraband. Image interpretation then becomes an overwhelming task. Frequently, much of the useful information is obtained from the backscatter image alone.

Figure 1:
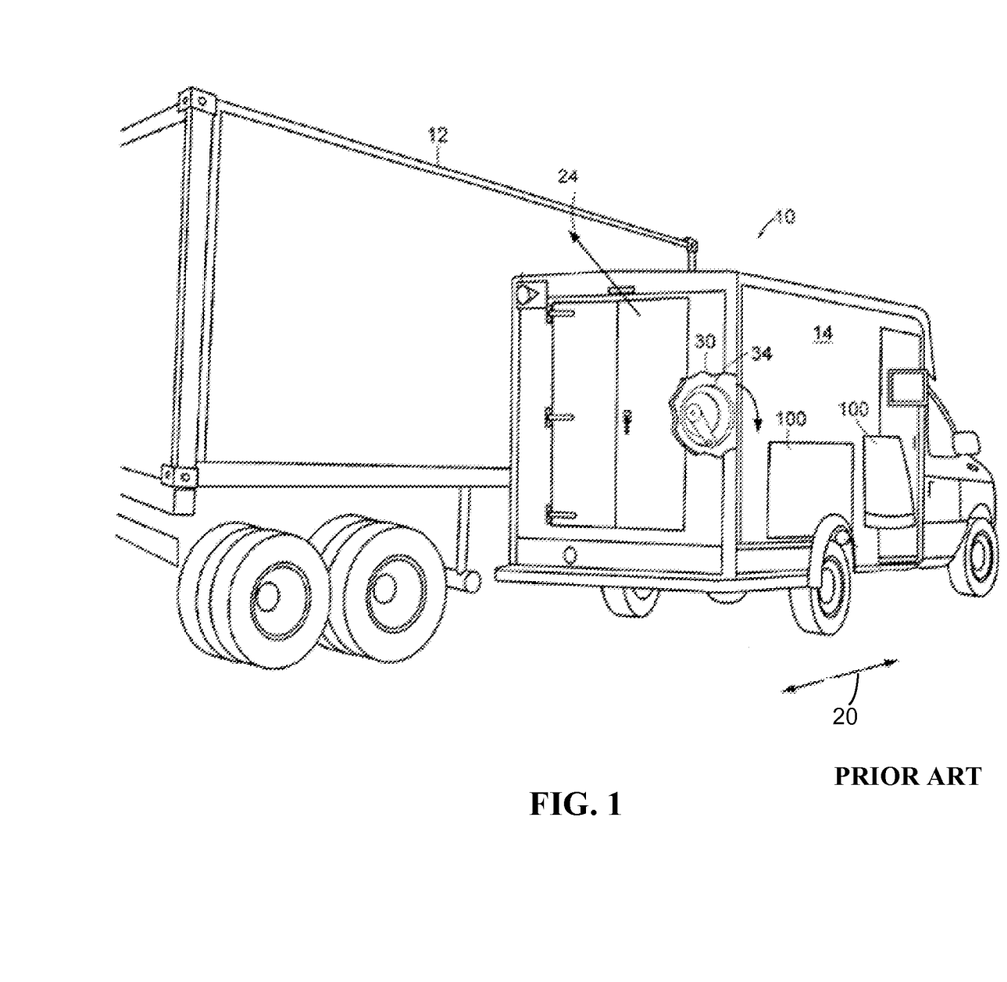
FIG. 1 is a perspective view, cutaway in part, of a prior art mobile cargo inspection system deployed on a truck capable of on-road travel for scanning of an enclosure such as a vehicle or cargo container while one or both of the inspection system and enclosure are in motion.

Referring now to FIG. 1, a system is shown in which detectors are mounted on a mobile platform, or conveyance 10, typically capable of road travel, that traverses a large object to be inspected such as a vehicle or a cargo container 12. Conveyance 10 is characterized by an enclosure 14, here, the skin of a van, shown, in cutaway view, to enable depiction of other components of an inspection system. The conveyance can have many alternate embodiments, including but not limited to gasoline, diesel, electric, propane, battery, fuel-cell, or hydrogen-powered motor vehicles (including vans, trucks, or similar), tracked vehicles, sleds, trailers, cranes, or other equipment that can be put into motion, preferably self-propelled, but also including vehicles tethered and pulled such as under electric power.

Contained within enclosure 14 of conveyance 10 is a source 30 (such as an x-ray tube) and a chopper 34, which may be a rotating hoop, for example. Chopper 34 may also be referred to, herein, as a "wheel." In accordance with preferred embodiments of the invention, source energies are typically below 250 keV, thus the chopper 34 may be smaller than employed in systems in which higher-energy x-rays are employed. Chopper 34 may be a rotating perforated hub, or a wheel with transmitting spokes, or any number of means, known in the art, for generation of flying spot beams that lie, typically, in a plane approximately orthogonal to the direction of motion of 20. Rotating hoop 34, with suitable apertures, emits a pencil beam 24, thereby enabling inspection of objects, possibly on either side of the conveyance. However, all sources are encompassed within the scope of the present invention when employed in the manner described in the present description. The x-ray source and detectors may be oriented to permit scanning from the conveyance's "driver's side", "passenger's side", or both sides simultaneously.

Wheel 34 is fabricated from a material, typically lead, that blocks transmission of x-rays except through apertures. X-rays 24 emerge from the currently illuminated channel as a pencil beam that is swept across vehicle or a cargo container 12 undergoing inspection as wheel 34 rotates. The dimensions of the pencil beam 24 typically govern the resolution of a system such as the one depicted. Apertures in wheel 34 may have various shapes, and may be circular or rectangular, and may be more specifically tailored. Other x-ray generation approaches may be used to produce a similar sweeping pencil beam, such as spinning discs with elongated slits, wheels with hollow spokes, are alternate embodiments.

Detector modules 50 are carried by conveyance 10 and typically enclosed within enclosure 14 and concealed from view from outside the conveyance. They may also be carried outside the conveyance for particular applications within the scope of the present invention. Detector modules 50 contain detectors for detecting penetrating radiation from source 30 that has interacted with, and scattered from, contents of the inspected object 12.

Figure 2:
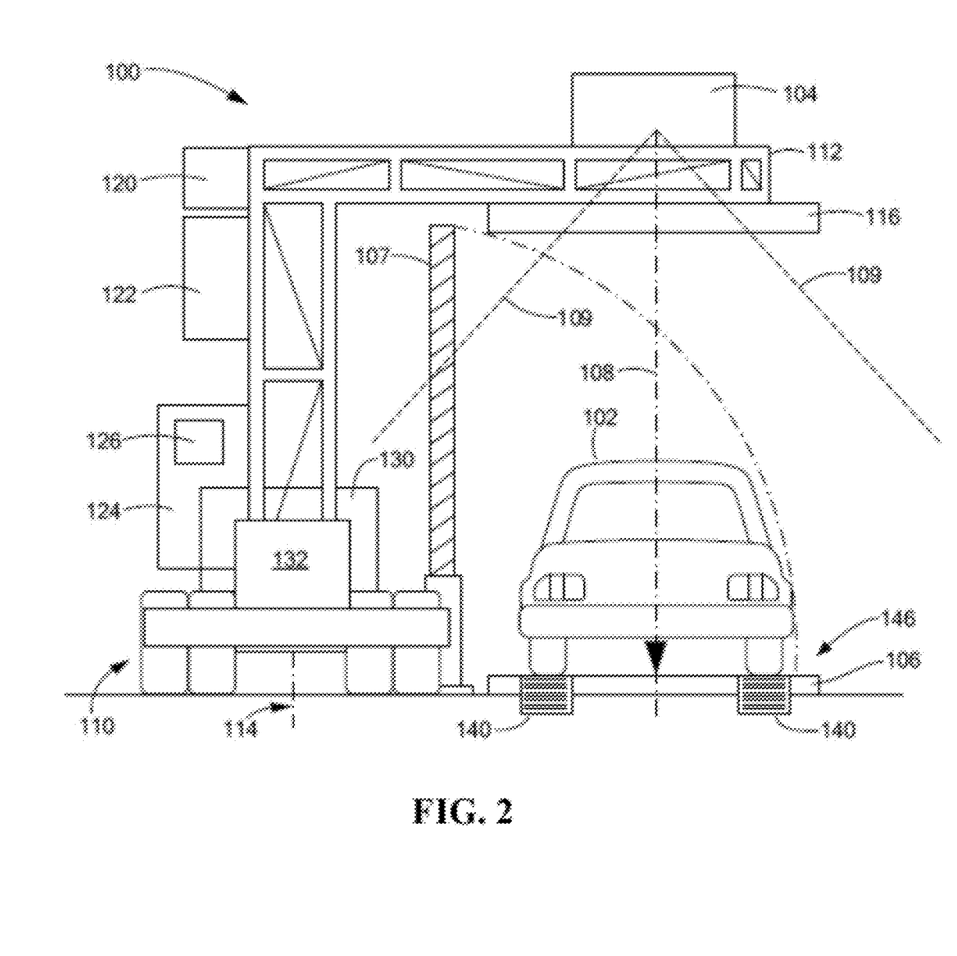
FIG. 2 shows an end view of an mobile x-ray inspection system in accordance with an embodiments of the present invention.

A mobile inspection unit in accordance with one embodiment of the present invention is now described with reference to FIG. 2, which shows a rapidly relocatable x-ray inspection device 100, designated generally by numeral 100 in a deployed configuration used for inspection of a vehicle 102. Both the relocatable x-ray inspection device 100 and the inspected vehicle 102 are seen from the back. The rapidly relocatable inspection device 100 is entirely integral with a conveyance, designated generally by numeral 110. Conveyance 110 may be a truck, capable of self-propulsion on, or off, roads, or conveyance 110 may also be a trailer that may be hauled by a truck or other self-propelled tractor.

Salient features of this embodiment of the rapidly relocatable x-ray inspection device 100 include a source 104 of downward-directed penetrating radiation and a transmission detector 106 of penetrating radiation that has been emitted by source 104 and has traversed the inspected vehicle 102. A top-down view through a vehicle provides a better view of most regions of the vehicle when compared with a lateral view, with superior views, particularly, of the trunk area, the fuel tank, and the seating area.

Source 104 typically includes an x-ray tube or other source of x-ray emission, as well as spectral-shaping elements, such as one or more filters, and beam-shaping elements, such as one or more collimators. In accordance with certain embodiments of the invention, x-rays having maximal energies in the range between 160 keV and 300 keV are employed. At this energy, x-rays penetrate into a vehicle, and organic objects inside the vehicle can be detected. Since lower doses of x-ray irradiation are thus possible, automobiles may be scanned using the present invention. For applications where the scanned vehicle may contain personnel, end point energies below 300 keV are preferred. The scope of the present invention, however, is not limited by the range of energies of the penetrating photons employed.

Spectral- and beam-shaping elements are described, for example, in U.S. Pat. No. 6,459,761, "Spectrally Shaped Inspection Beam," issued Oct. 1, 2002, and incorporated herein by reference.

In certain embodiments of the invention, such as those that employ backscatter imaging, the emission of source 104 is shaped into a beam 108 that has the shape of a pencil beam. However, in other embodiments of the invention, beam 108 may be a fan beam, or may have another cross-sectional profile. Beam 108 may be swept, such as by means of a chopper wheel, as described, for example, in U.S. Pat. No. 6,459,764, "Drive-Through Vehicle Inspection System," issued Oct. 1, 2002, and incorporated herein by reference.

Source 104 is disposed on a deployable member, which, in the embodiment depicted in FIG. 1, is a boom 112 that may be extended outward from conveyance 110 by rotation about a central axis designated by line 114 which is substantially perpendicular to the direction of road travel of the conveyance. Typically, boom 112 rotates by approximately 90° between its stowed position, for on-road travel, and its deployed position, for inspection operation.

Conveyance 110 also carries a high-voltage power supply 120 to power source 104 as well as a cooling module 122 and an electronics module 124, including controller 126. Additionally, conveyance 110 typically includes an electrical generator 130, such as a gasoline-powered genset, and a fuel tank 132.

Either separately, or concurrently with transmission imaging by means of transmission detector 106, a scatter image may be obtained through use of a scatter detector, such as backscatter detector 116. Where scatter information is to be obtained, beam 108 is a pencil beam, and it is swept between scan limits 109 in a plane transverse to forward motion of vehicle 102 through x-ray inspection device 100.

In a case where transmission imaging is performed, one or more ramps 140 may be provided to allow vehicle 102 to smoothly transition over a module 146 in which transmission detector 106 is contained. Module 146 is stowed aboard conveyance 110 in a vertical position shown by the dashed lines designated by numeral 107, or can be manually stowed on conveyance 110. For inspection operations, module 146 is deployed such that transmission detector 106 is parallel to the ground, while remaining coupled to conveyance 110.

In response to penetrating radiation transmitted through, or scattered by, vehicle 102 and its contents, transmission detector 106 and/or backscatter detector 116 produce transmission and backscatter signals, respectively. Controller 126 processes data from the transmission and/or backscatter signals to produce one or more images that may be displayed on a display device (not shown) to be viewed by an operator who may be located either locally or remotely to conveyance 110.

Besides imaging contents of inspected vehicles, in terms of which embodiments of the present invention have been described, other characteristics of inspected objects may be obtained within the scope of the present invention. For example, transmission and backscatter techniques may be applied, as known in the art, for deriving mass, mass density, mass distribution, mean atomic number, or likelihood of containing targeted threat material.

Figure 3A:
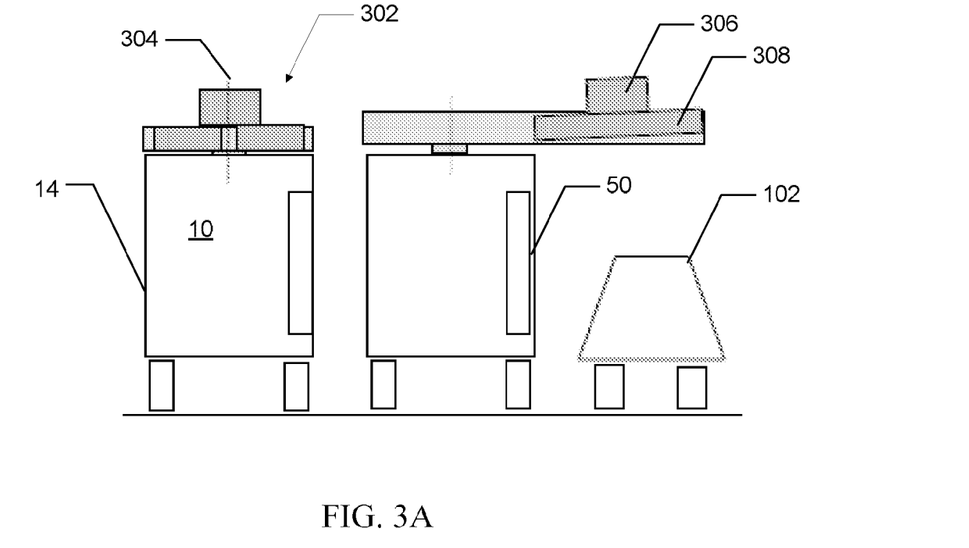
FIGS. 3A and 3B show schematic rear views of mobile x-ray inspection systems providing deployable down-looking scatter imaging modules in accordance with embodiments of the present invention.
Figure 3B:
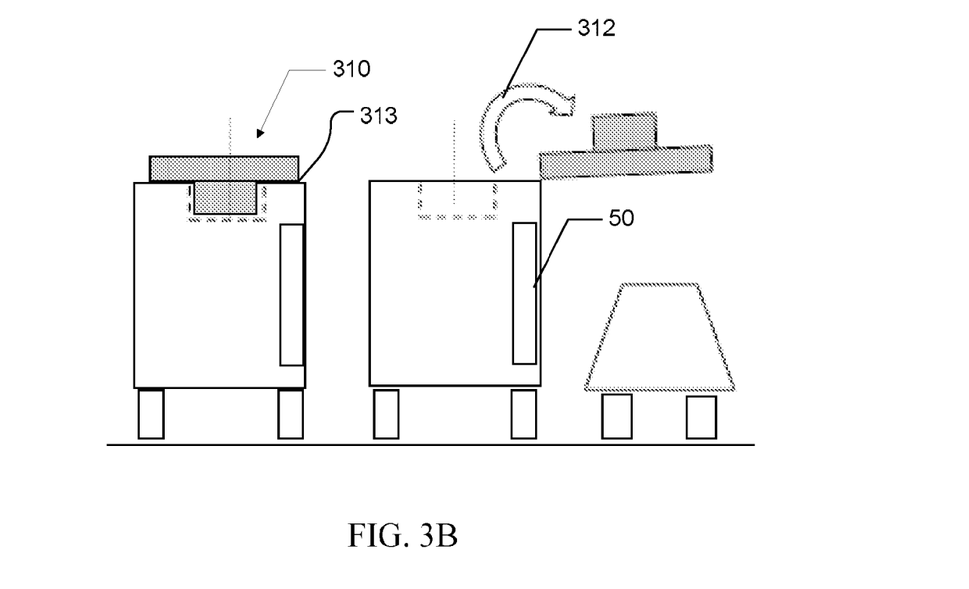

Other embodiments of the present invention are now described with reference to FIGS. 3A and 3B where mobile platform 10 contains a side-directed x-ray backscatter inspection system, as described above with reference to FIG. 1. In FIG. 3A, mobile platform 10 has a source 306 of penetrating radiation disposed on a deployable member, designated generally by numeral 302. Deployable member 302, which may also be referred to as a "boom," may be rotated about axis 304 from a forward-facing position suitable for road transport to the sideward-facing position shown to the right, such that source 306 is positioned over vehicle 102 (or other inspected object) during the course of inspection operations. Alternatively, deployable member 302 may slide out in a horizontal direction from a stowed position to an operational position. Penetrating radiation scattered from inspected vehicle 102 is then detected by scatter detector 50 disposed inside mobile platform 10, or by a backscatter detector 308 deployed along with deployable member 302. One or more scatter detectors may also be disposed outside enclosure 14 of mobile platform 10. Alternatively, as shown in FIG. 3B, deployable member 310 may deploy by rotation along path 312 about a horizontal axis 313 parallel to the direction of motion of the mobile platform. Detector signals from each detector active during scanning by downward-directed source 306 and sideward directed source 30 (shown in FIG. 1) are processed by controller 126 to provide scatter images. Source 306 and source 30 may be operated in a temporally interleaved manner so as to provide for respective downward-directed and sideward-directed scatter images without cross-talk interference between the sources.

Embodiments of the invention such as those depicted in FIGS. 3A and 3B are advantageous for inspection of passenger vehicles or other objects 102 shorter than the height of mobile platform 10, typically on the order of 7' tall. Such objects may now be imaged from above, using lower-energy sources than those typically employed for side-directed inspection, since imaging need only be performed through a single layer of steel, namely the roof or trunk lid of a car. In typical applications, limiting x-ray energies on the order of 140-160 keV are adequate for down-looking backscatter inspection.

The scatter image, obtained from scatter of down-directed irradiation, orthogonal to that provided by the side-directed beam of the inspection van of FIG. 1, may advantageously improve detection of certain organic threats and of weapons or other contraband hidden on the floor of vehicle 102, and similarly concealed items.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. An inspection system for inspecting an object, the system comprising:
   a. a conveyance capable of on-road travel;
   b. a deployable member coupled to the conveyance and adapted for rotation about a horizontal axis from a stowed position to an operational position;
   c. a first source of penetrating radiation disposed on the deployable member for providing a first beam of penetrating radiation directed in a substantially vertical direction;
   d. a second source of penetrating radiation disposed upon the conveyance for providing a second beam of penetrating radiation directed in a varying direction, the varying direction passing through a horizontal direction;
   e. a first detector for detecting penetrating radiation from at least the first source after interaction of the object with the first beam of penetrating radiation and for generation of a downward-looking scatter signal corresponding to radiation scattered from the first beam; and
   f. a controller for creating an image of contents of the object based at least on the downward-looking scatter signal.

2. The inspection system as set forth in claim 1, further comprising a second detector for detecting penetrating radiation from at least the second source after interaction of the object with the second beam of penetrating radiation and for generation of a side-looking scatter signal corresponding to radiation scattered from the second beam.

3. The inspection system as set forth in claim 1, wherein the deployable member is a boom.

4. The inspection system as set forth in claim 3, wherein the boom is capable of extension outward at approximately 90° to a central axis of the conveyance during the course of inspection.

5. The inspection system as set forth in claim 1, wherein the conveyance is self-propelled.

6. The inspection system as set forth in claim 1, wherein the conveyance includes a trailer.

7. The inspection system of claim 1, wherein the first detector is mechanically coupled to the conveyance.

8. The inspection system as set forth in claim 1, wherein the first detector is adapted for deployment from the conveyance prior to inspection operation.

9. A method for inspecting an object, the method comprising:
   a. providing a conveyance capable of on-road travel;
   b. illuminating an inspected object with a first beam of penetrating radiation emanating from a first source coupled to the conveyance by a deployable member adapted for rotation about a horizontal axis from a stowed position to an operational position, the first beam of penetrating radiation directed in a substantially vertical direction;
   c. illuminating the inspected object with a second beam of penetrating radiation emanating from a second source disposed within the conveyance, the second beam directed in a varying direction, the varying direction passing through a horizontal direction;
   d. detecting with a first detector penetrating radiation from at least the first source after interaction of the object with the first beam of penetrating radiation;
   e. generating a downward-looking scatter signal corresponding to radiation scattered from the first beam; and
   f. creating with a controller an image of contents of the object based at least on the downward-looking scatter signal.

\* \* \* \* \*